Nov. 19, 1935.  W. F. SCHACHT  2,021,522

RUBBER MAT FOR RUNNING BOARDS AND THE LIKE

Filed June 22, 1934

Inventor
William F. Schacht
By
Alexander H. Powell
Attorney

Patented Nov. 19, 1935

2,021,522

UNITED STATES PATENT OFFICE 2,021,522

RUBBER MAT FOR RUNNING BOARDS AND THE LIKE

William F. Schacht, Huntington, Ind.

Application June 22, 1934, Serial No. 731,978

3 Claims. (Cl. 154—49)

This invention is a novel improvement in rubber mats particularly adapted for mounting upon the running boards of automobiles, usually made of metal, said mats being adapted to be secured thereon by use of rubber cement and solvents without resorting to use of mechanical securing devices or to application of vulcanizing heat and pressure, and providing a neat serviceable and economical mat applicable initially to the metal of the running board or applicable as a replacement over the worn surface of a running board, whether of metal, rubber, linoleum, wood, or other material. My mat may also be used as covers for stair treads, and for many other analogous uses.

The principal object of my invention is to provide a running board mat consisting briefly of a completely vulcanized rubber body portion, having a "tacky" facing on its attaching face uniformly partially vulcanized to the body, said partially vulcanized facing being normally sticky or "tacky" on its surface (similar to pure milled raw rubber) and readily susceptible to the action of ether, gasoline, or other such well known solvents, to dissolve a film of rubber from the "tacky" facing. Upon the solvent evaporating, the rubber dissolved from the unvulcanized, raw, and softened facing will readily unite with rubber cement applied to the metal of the running board or other base surface to form an efficient attaching means which will resist any strong efforts at separation.

Until recently, running boards were made of wood; but at the present time most are made of metal and are usually covered with rubber vulcanized directly on the metal running board. Experience has shown that in a short time the rubber surface of such vulcanized boards becomes worn and soon holes wear through the rubber. In order to replace such vulcanized running board it was necessary previous to my invention to purchase and install an entire new board since the rubber mat was vulcanized to the board.

By use of my novel rubber mat however, which may be of size and shape to suit that of the running board, or which may be of small rectangular shape suitable for replacing worn portions or for stair treads, a new tread surface may be readily and quickly applied directly over the worn surface as a base by an unskilled person without necessitating purchasing a new running board.

I will explain the invention with reference to the accompanying drawing which illustrates several practical embodiments thereof to enable others familiar with the art to adopt and use the same; and will summarize in the claims the novel features of construction, and novel combinations of parts, for which protection is desired.

Figure 1:
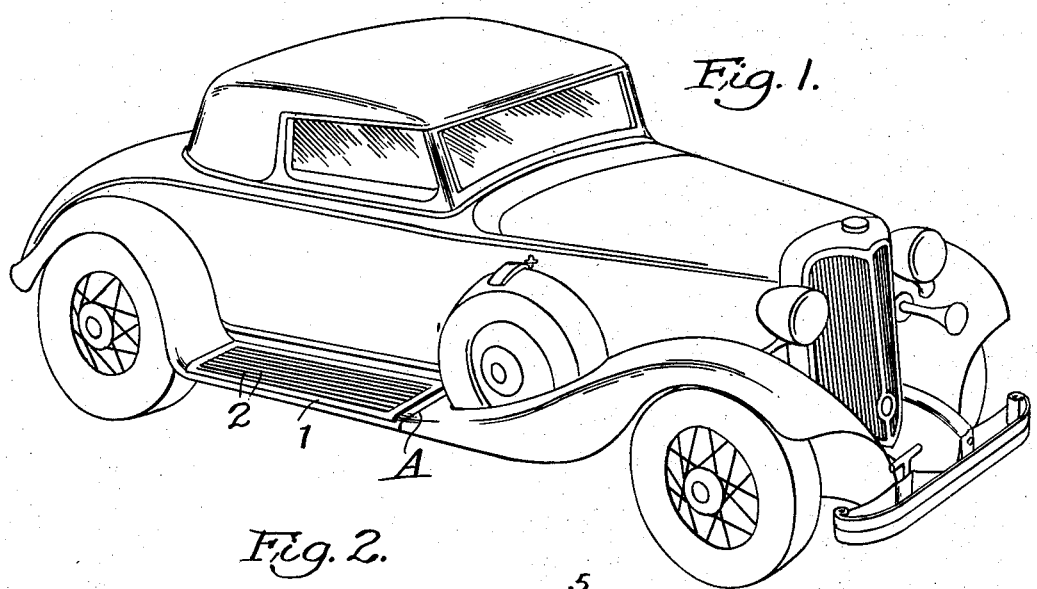
Fig. 1 is a perspective view of an automobile showing one form of my rubber mat applied to the running board.

As shown in Fig. 1, my novel rubber mat is of size and shape to suit the particular running board A which is usually made of metal, the mat consisting of a substantially rectangular rubber body 1 preferably having raised ribs 2 on its upper face and disposed parallel with the outer edge of the running board A, but the upper surface may be otherwise roughened to prevent a shoe or foot from slipping thereon.

The body portion 1 of the mat is of completely vulcanized rubber; and on the underside of the body 1 is a facing 3 (Figs. 4 and 5) of a slowly vulcanizing or unvulcanizable rubber composition having a "tacky" surface which will be readily dissolved by the action of solvents such as ether or gasoline when the mat is to be applied to the running board, the "tacky" surface of facing 3 being normally protected from the atmosphere by application of a holland 4 (Fig. 4) covering the exposed surface thereof.

There are various methods of making the mat. I prefer to use an unlaminated mat formed by mixing together in a mill the various ingredients which form the vulcanizable body 1 of the mat, which ingredients may consist of rubber impregnated with such substances and in such quantities which will harden and toughen upon vulcanization. The milled vulcanizable rubber of the body 1 is run through a calender and rolled into sheets of proper thickness.

I then mix and mill together the ingredients which form the slowly vulcanizable, or unvulcanizable, facing 3, and place same in the calendar, and the previously formed sheets of vulcanizable rubber which will form the body 1 are then re-run through the calender, rolling a thin film of the unvulcanizable rubber stock onto or into one face of the vulcanizable sheets to form a composite solid unlaminated mass, the thickness of the unvulcanizable rubber film being such that the tackiness and desired characteristic of the attaching surface of the facing 3 is not destroyed by the subsequent vulcanizing process.

The composite sheet material above described is then blanked in the raw state to proper shape for molding, and the blanks placed in the mold and vulcanized sufficiently to completely cure the body 1 and to simultaneously form the raised ribs 2 on the upper surface of the body; while the substantially raw rubber facing 3 remains "tacky" and unvulcanized or at least only slightly "set".

Before molding the mats I place a sheet of holland 4 over the unvulcanizable facing 3, the holland preventing sticking of the substantially raw rubber facing 3 to the mold during the process of vulcanization.

By the term "unvulcanizable rubber" I do not necessarily mean a rubber composition chemically free from sulphur or other vulcanizing agent, but a composition which will not vulcanize, although some ingredients of the "unvulcanizable" facing may be present in sufficient quantity to slightly "set" the facing 3 so that it will not be quite as "tacky" or sticky as chemically pure raw rubber. I may use for the "unvulcanizable rubber" facing 3 a composition consisting of 100 lbs. smoked sheets (rubber); 4 lbs. magnesia carbonate; and 4 oz. sulphur. The facing 3 can be made of the raw rubber, or of a compounded rubber, or of a rubber compound which would contain a small amount of sulphur provided it would be sufficiently "tacky" to be soluble by solvents or rubber cement. While chemically pure raw rubber might be used for the facing 3 a composition which will slightly "set" is preferred in order to prevent the mat from "creeping" on the running board when the latter is heated due to the sun's rays on a hot day, or due to artificial heat. The inclusion of small amounts of the above mentioned ingredients will not cause the facing to vulcanize, but simply to partially "set" when the mat is vulcanized (the amounts of ingredients being insufficient to alter to any appreciable degree the "tacky" readily soluble nature of the attaching surface) and such partial "setting" of the unvulcanizable components of the facing prevents "creeping", i. e., the tendency of the mat to shift with respect to the running board due to softening of the facing 3 under the influence of heat.

The mats are cured for about ten minutes at a boiler steam pressure of about 70 pounds, such short duration of vulcanization being insufficient to permit the sulphur in the vulcanizable portion 1 migrating upwardly through the mat to any extent into the unvulcanizable facing 3, and therefore when the mats are taken from the mold the body portion 1 will be completely vulcanized, while the facing 3 will have the characteristics to a large degree of raw rubber, i. e., the tackiness and stickiness and the ability to be readily dissolved upon application of solvents for attachment to the metal, rubber, linoleum, wood or other base A to which a coating of rubber cement is applied, the holland 4 being removed just prior to the application of solvent to the facing 3.

Another method of applying this unvulcanizable rubber facing 3 to the body 1, is to first vulcanize the body portion 1 of the mat, and then cement the facing 3 on the back of the body 1, thereby forming a laminated mat. Also the body 1 of the mat could be partly vulcanized, and then the unvulcanizable facing 3 placed upon the body 1, and the composite sheet reset in the mold and heated sufficient to thoroughly vulcanize the body 1, leaving the facing 3 unvulcanized.

Figure 2:
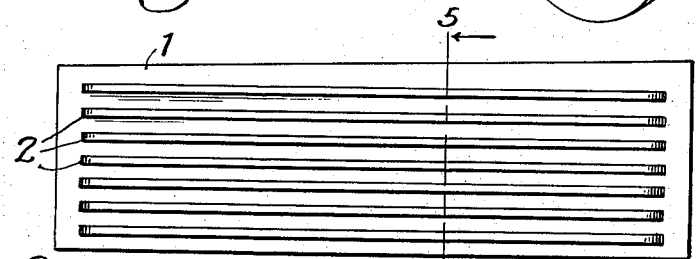
Fig. 2 is an enlarged top plan view of the running board mat, detached.
Figure 3:
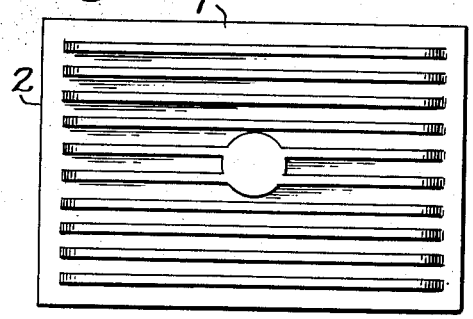
Fig. 3 is an enlarged top plan view of a modified mat.
Figure 4:
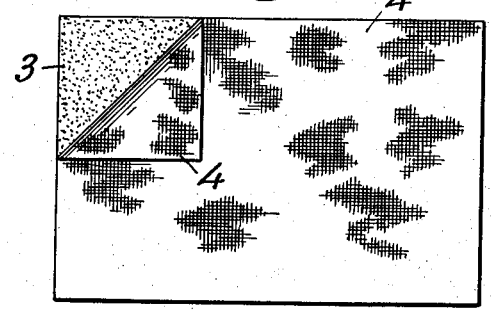
Fig. 4 is a bottom plan view of the mat shown in Fig. 3.
Figure 5:
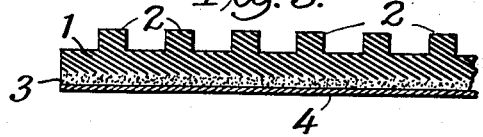
Fig. 5 is a section on the line 5—5, Fig. 2.

The mat could be of such shape that it would fit the entire running board as shown in Figs. 1 and 2; or it could be made in smaller sizes if desired, as shown in Figs. 3 and 4.

I claim:—

1. A rubber mat for running boards and the like, consisting of a body portion composed of completely vulcanized rubber; and a substantially unvulcanized rubber facing on the body portion containing sufficient compounding ingredients to prevent "creeping" of the mat on the board, the exposed face of the facing being readily soluble by rubber solvent; and a protective layer covering said facing.

2. A rubber mat for running boards and the like, consisting of a body portion composed of completely vulcanized rubber; and a substantially unvulcanized rubber facing on the body containing sufficient sulphur to prevent "creeping" of the mat on the board, the exposed face of the facing being readily soluble by rubber solvent; and a protective layer covering said facing.

3. A rubber mat for running boards and the like, consisting of a body portion composed of completely vulcanized rubber and having a roughened upper surface; and a rubber facing uniformly partially vulcanized to the body portion, said facing containing sufficient sulphur to prevent "creeping" of the mat on the board, the exposed face of this facing being readily soluble by rubber solvent; and a protective layer covering said facing.

WILLIAM F. SCHACHT.